United States Patent
Joshi et al.

(10) Patent No.: US 11,610,052 B2
(45) Date of Patent: Mar. 21, 2023

(54) TECHNIQUES FOR AUTOMATED CONTROL OF COMPUTER PROGRAMS THROUGH TEXT-BASED USER INTERFACES

(71) Applicant: Soroco Private Limited, London (GB)

(72) Inventors: Sarthak Joshi, Bengaluru (IN); Gaurav Srivastava, Rajasthan (IN); Abdul Qadir, Bangalore (IN); Shreyas Harsha Karanth, Bangalore (IN)

(73) Assignee: Soroco Private Limited, London (GB)

( * ) Notice: Subject to any disclaimer, the term of this patent is extended or adjusted under 35 U.S.C. 154(b) by 0 days.

(21) Appl. No.: 16/542,638

(22) Filed: Aug. 16, 2019

(65) Prior Publication Data
US 2020/0057802 A1    Feb. 20, 2020

Related U.S. Application Data

(60) Provisional application No. 62/764,901, filed on Aug. 16, 2018.

(51) Int. Cl.
| | | |
|---|---|---|
| *H04L 67/08* | (2022.01) | |
| *G06F 40/174* | (2020.01) | |
| *G06F 9/451* | (2018.01) | |
| *G06F 8/38* | (2018.01) | |

(52) U.S. Cl.
CPC .............. *G06F 40/174* (2020.01); *G06F 8/38* (2013.01); *G06F 9/451* (2018.02)

(58) Field of Classification Search
CPC .......... G06F 40/174; G06F 8/38; G06F 9/451; G06F 9/45512; H04L 67/08
See application file for complete search history.

(56) References Cited

U.S. PATENT DOCUMENTS

| | | | | |
|---|---|---|---|---|
| 6,697,088 B1 * | 2/2004 | Hollander | ............... | G06F 9/451 715/744 |
| 6,836,780 B1 * | 12/2004 | Opitz | ......................... | G06F 8/38 |
| 7,523,025 B2 * | 4/2009 | Masushige | ............ | G06F 13/107 709/227 |

(Continued)

OTHER PUBLICATIONS

[No Author Listed], Automating Terminals and Mainframes. Knowledge Base. https://www.uipath.com/kb-articles/automating-teiminals-and-mainframes last accessed Nov. 15, 2019, 12 pages.

(Continued)

*Primary Examiner* — Hien L Duong
(74) *Attorney, Agent, or Firm* — Wolf, Greenfield & Sacks, P.C.

(57) ABSTRACT

Techniques for programmatically controlling computer programs that are configured to be controlled via text-based user interfaces. The techniques include using at least one computer hardware processor to perform: accessing a string specifying content of a user interface (UI) screen of a computer program configured to be controlled via a text-based user interface; generating, based on the string, a two-dimensional (2D) representation of the UI screen; identifying a first controllable UI element in the UI screen at least in part by processing text in the 2D representation of the UI screen; and controlling the computer program by causing, via the first controllable UI element, the computer program to perform at least one action in furtherance of a task.

18 Claims, 14 Drawing Sheets

(56) References Cited

U.S. PATENT DOCUMENTS

| | | | |
|---|---|---|---|
| 8,954,869 B2* | 2/2015 | Courteaux | G06F 8/38 |
| | | | 715/762 |
| 9,471,405 B1 | 10/2016 | Mor | |
| 9,965,139 B2 | 5/2018 | Nychis et al. | |
| 10,120,653 B2 | 11/2018 | Kim et al. | |
| 10,156,958 B2 | 12/2018 | Nychis et al. | |
| 10,268,333 B2 | 4/2019 | Nychis et al. | |
| 10,310,701 B2 | 6/2019 | Nychis et al. | |
| 10,474,313 B2 | 11/2019 | Nychis et al. | |
| 10,521,078 B2* | 12/2019 | Narayanan | G06F 9/451 |
| 11,029,802 B2* | 6/2021 | Zhao | G06F 3/0489 |
| 11,100,278 B2* | 8/2021 | Hill | G06F 40/143 |
| 2002/0019884 A1* | 2/2002 | Gungabeesoon | G06F 9/541 |
| | | | 719/310 |
| 2003/0193521 A1* | 10/2003 | Chen | G06F 9/451 |
| | | | 715/762 |
| 2007/0094367 A1* | 4/2007 | Esfahany | G06F 9/5077 |
| | | | 709/223 |
| 2008/0021842 A1* | 1/2008 | Pintos | G06F 9/541 |
| | | | 705/1.1 |
| 2010/0082733 A1* | 4/2010 | Bernstein | H04L 12/6418 |
| | | | 709/203 |
| 2011/0119603 A1* | 5/2011 | Peltz | G06F 9/45512 |
| | | | 715/762 |
| 2011/0153530 A1* | 6/2011 | Nachimson | G06F 8/74 |
| | | | 706/12 |
| 2013/0073486 A1* | 3/2013 | Petrick | H04L 41/142 |
| | | | 706/12 |
| 2013/0263043 A1* | 10/2013 | Sarbin | G06F 3/0488 |
| | | | 715/784 |
| 2014/0026057 A1* | 1/2014 | Kimpton | G06F 9/451 |
| | | | 715/733 |
| 2014/0280831 A1* | 9/2014 | Gao | H04L 41/22 |
| | | | 709/223 |
| 2014/0280875 A1* | 9/2014 | Narayanan | G06F 3/0484 |
| | | | 709/224 |
| 2016/0259651 A1 | 9/2016 | Nychis et al. | |
| 2016/0259652 A1 | 9/2016 | Nychis et al. | |
| 2016/0259653 A1 | 9/2016 | Nychis et al. | |
| 2016/0259654 A1 | 9/2016 | Nychis et al. | |
| 2016/0259655 A1 | 9/2016 | Nychis et al. | |
| 2016/0259717 A1 | 9/2016 | Nychis et al. | |
| 2017/0295243 A1* | 10/2017 | Kim | H04L 67/131 |
| 2018/0032490 A1* | 2/2018 | Hill | G06F 40/186 |
| 2018/0067729 A1 | 3/2018 | Apkon et al. | |
| 2018/0067739 A1 | 3/2018 | Apkon et al. | |
| 2018/0067836 A1 | 3/2018 | Apkon et al. | |
| 2018/0113780 A1 | 4/2018 | Kim et al. | |
| 2018/0113781 A1 | 4/2018 | Kim et al. | |
| 2018/0181377 A1 | 6/2018 | Kim et al. | |
| 2018/0189093 A1 | 7/2018 | Agarwal et al. | |
| 2018/0225010 A1 | 8/2018 | Nychis et al. | |
| 2018/0241846 A1* | 8/2018 | Narayanan | H04L 41/0889 |
| 2018/0322004 A1 | 11/2018 | Jain et al. | |
| 2019/0034041 A1 | 1/2019 | Nychis et al. | |
| 2019/0034173 A1 | 1/2019 | Kim et al. | |
| 2019/0065351 A1* | 2/2019 | Rakhmilevich | G06F 11/3692 |
| 2019/0196665 A1 | 6/2019 | Nychis et al. | |
| 2019/0302968 A1 | 10/2019 | Nychis et al. | |

OTHER PUBLICATIONS

PCT/IB2019/000933, dated Feb. 7, 2020, International Search Report and Written Opinion.

International Search Report and Written Opinion for International Application No. PCT/IB2019/000933 dated Feb. 7, 2020.

Libes, Automation and Testing of Character-graphic Programs. Software: Practice and Experience. Feb. 1997;27(2):123-37.

* cited by examiner

FIG. 10

| GROSS TOTAL INCOME: | GROSS TOTAL INCOME: | GROSS TOTAL INCOME: |

FIG. 11

| GROSS　　　　　TOTAL INCOME: |

| GROSS

TOTAL INCOME: |

FIG. 12

| THE GROSS TOTAL INCOME IS USED IN THE PROFIT CALCULATION |

FIG. 13

ADDRESS: FLAT 1,　　　　　　　　　DATE
　　　　　ABC STREET,
　　　　　XYZ CITY.

SUMMARY

FIG. 14

```
TOTAL: 100  DATE: 1/1/2001
        TAX: 10
```

FIG. 15

```
AMOUNT  PAID  TAX REMAINING
PAID    TAX
```

FIG. 16

| DATE | DESCRIPTION |
|---|---|
| 1/1/2001 | ROW 1 LINE 1 |
|  | ROW 1 LINE 2 |
| 2/1/2001 | ROW 2 LINE 1 |
|  | ROW 2 LINE 2 |

FIG. 17

| DATE | DESCRIPTION |
|---|---|
| 1/1/2001 | 100 |
| 2/1/2001 | 200 |

SUMMARY

FIG. 18

| DATE | AMOUNT |
|---|---|
| 1/1/2001 | 100 |
| 2/1/2001 | 200 |
| SUMMARY | |

FIG. 19

| DATE | AMOUNT |
|---|---|
| 1/1/2001 | 100 |
| 2/1/2001 | 200 |
| SUMMARY IS WRITTEN BELOW | |

FIG. 20

| ITEM | CODE | QUANTITY | PRICE | AMOUNT |
|---|---|---|---|---|
| PEN | 001 | 10 | 25.00 | 250.00 |
| ERASER | 002 | 20 | 5.00 | 100.00 |

TECHNIQUES FOR AUTOMATED CONTROL OF COMPUTER PROGRAMS THROUGH TEXT-BASED USER INTERFACES

CROSS-REFERENCE TO RELATED APPLICATIONS

This Application claims the benefit under 35 U.S.C. § 119(e) of U.S. Provisional Application Ser. No. 62/764,901, entitled "AUTOMATED CONTROL OF TERMINAL APPLICATIONS" filed Aug. 16, 2018, which is incorporated by reference in its entirety.

BACKGROUND

A software robot computer program executing on a virtual machine may be used to control one or more computer programs (e.g., one or more application programs and/or operating systems) executing on the virtual machine to perform a task. The software robot may control the computer program(s) at least in part through their graphical user interfaces. When a computer program (e.g., a software robot, an application program, an operating system) executes on a virtual machine, the computer program uses hardware resources of the computing device executing the virtual machine such as the computing device's processor and memory.

SUMMARY

Some embodiments are directed to a method for programmatically controlling computer programs that are configured to be controlled via text-based user interfaces. The method comprises using at least one computer hardware processor to perform: accessing a string specifying content of a user interface (UI) screen of a computer program configured to be controlled via a text-based user interface; generating, based on the string, a two-dimensional (2D) representation of the UI screen; identifying a first controllable UI element in the UI screen at least in part by processing text in the 2D representation of the UI screen; and controlling the computer program by causing, via the first controllable UI element, the computer program to perform at least one action in furtherance of a task.

Some embodiments are directed to a system for programmatically controlling computer programs that are configured to be controlled via text-based user interfaces. The system comprises at least one computer hardware processor configured to perform: accessing a string specifying content of a user interface (UI) screen of a computer program configured to be controlled via a text-based user interface; generating, based on the string, a two-dimensional (2D) representation of the UI screen; identifying a first controllable UI element in the UI screen at least in part by processing text in the 2D representation of the UI screen; and controlling the computer program by causing, via the first controllable UI element, the computer program to perform at least one action in furtherance of a task.

Some embodiments are directed to at least one non-transitory computer-readable storage medium storing processor executable instructions that, when executed by at least one computer hardware processor, cause the at least one computer hardware processor to perform a method for programmatically controlling computer programs that are configured to be controlled via text-based user interfaces. The method comprises: accessing a string specifying content of a user interface (UI) screen of a computer program configured to be controlled via a text-based user interface; generating, based on the string, a two-dimensional (2D) representation of the UI screen; identifying a first controllable UI element in the UI screen at least in part by processing text in the 2D representation of the UI screen; and controlling the computer program by causing, via the first controllable UI element, the computer program to perform at least one action in furtherance of a task.

BRIEF DESCRIPTION OF DRAWINGS

Various non-limiting embodiments of the technology will be described with reference to the following figures. It should be appreciated that the figures are not necessarily drawn to scale.

FIG. 10 shows three examples of how a key "GROSS TOTAL INCOME:" can appear on screen.

FIGS. 11 and 12 show examples of invalid keys.

FIG. 13 shows an example of a key-value pair with key "ADDRESS".

FIG. 14 shows an example of three key-value pairs with keys "TOTAL:", "DATE:" and "TAX:".

FIG. 15 shows an example of table with three headings "AMOUNT PAID", "PAID TAX" and "TAX REMAINING".

FIG. 16 shows an example of table in which texts "ROW 1 LINE 2" and "ROW 2 LINE 2" are merged with texts listed above them.

FIG. 17 shows an example of table in which the line "SUMMARY" is more than the cutoff distance apart from the last line of the table.

FIG. 18 shows an example in which the word "SUMMARY" doesn't have the expected value for the date data type.

FIG. 19 shows an example of table in which the line "SUMMARY IS WRITTEN BELOW" forms one cluster and spans across both columns, thereby indicating an end of the table.

FIG. 20 shows an example wrapped table.

DETAILED DESCRIPTION

Software robot computer programs (hereinafter, "software robots") are computer programs configured to programmatically control one or more other computer programs (e.g., one or more application programs and/or one or more operating systems) at least in part via the graphical user interfaces of the other computer program(s). A software robot may be, for example, a computer program configured to programmatically control one or more other computer programs (e.g., one or more application programs and/or one or more operating systems) to perform one or more tasks at least in part via the graphical user interfaces (GUIs) and/or application programming interfaces (APIs) of the other computer program(s). A task may be, for example, a sequence of one or more actions (e.g., buttons clicks and/or keystrokes provides as input to one or more application programs) that culminates in an objective being completed such as resetting a password or creating a document.

Some software robots are configured to programmatically control one or more other computer programs via an object hierarchy that reflects the hierarchical relationships among the GUI elements of the computer program(s) being controlled. The object hierarchy that is used to control the computer program(s) may be generated based on information obtained from an operating system executing the computer program(s). For example, relationships among the GUI elements in a computer program implemented using a WINDOWS GUI application library may be identified based on information obtained from the WINDOWS operating system via the WINDOWS Automation API. Such information may include a hierarchical representation of the relationships among the GUI elements and an object hierarchy for controlling these GUI elements may be generated from this information. Aspects of software robots and controlling computer program GUIs via respective object hierarchies are described in U.S. Patent Application Publication No. 2016/0259651, titled "Software Robots for Programmatically Controlling Computer Programs to Perform Tasks," which is a publication of U.S. patent application Ser. No. 15/059,638, filed on Mar. 3, 2016. U.S. Patent Application Publication No. 2016/0259651 is incorporated by reference herein in its entirety.

The inventors have recognized that techniques for programmatically controlling computer programs with GUIs do not apply to computer programs that are configured to be controlled solely via text-based user interfaces (UIs). Nonetheless, the inventors have appreciated that organizations having business processes that involve interacting with computer programs(s) with text-based UIs would benefit from the ability to programmatically control these text-based computer programs in addition to computer programs that may be controlled by GUIs. Hereinafter, a computer program that is configured to be controlled via a text-based UI may be referred to as a computer program with a text-based UI.

Figure 1A:
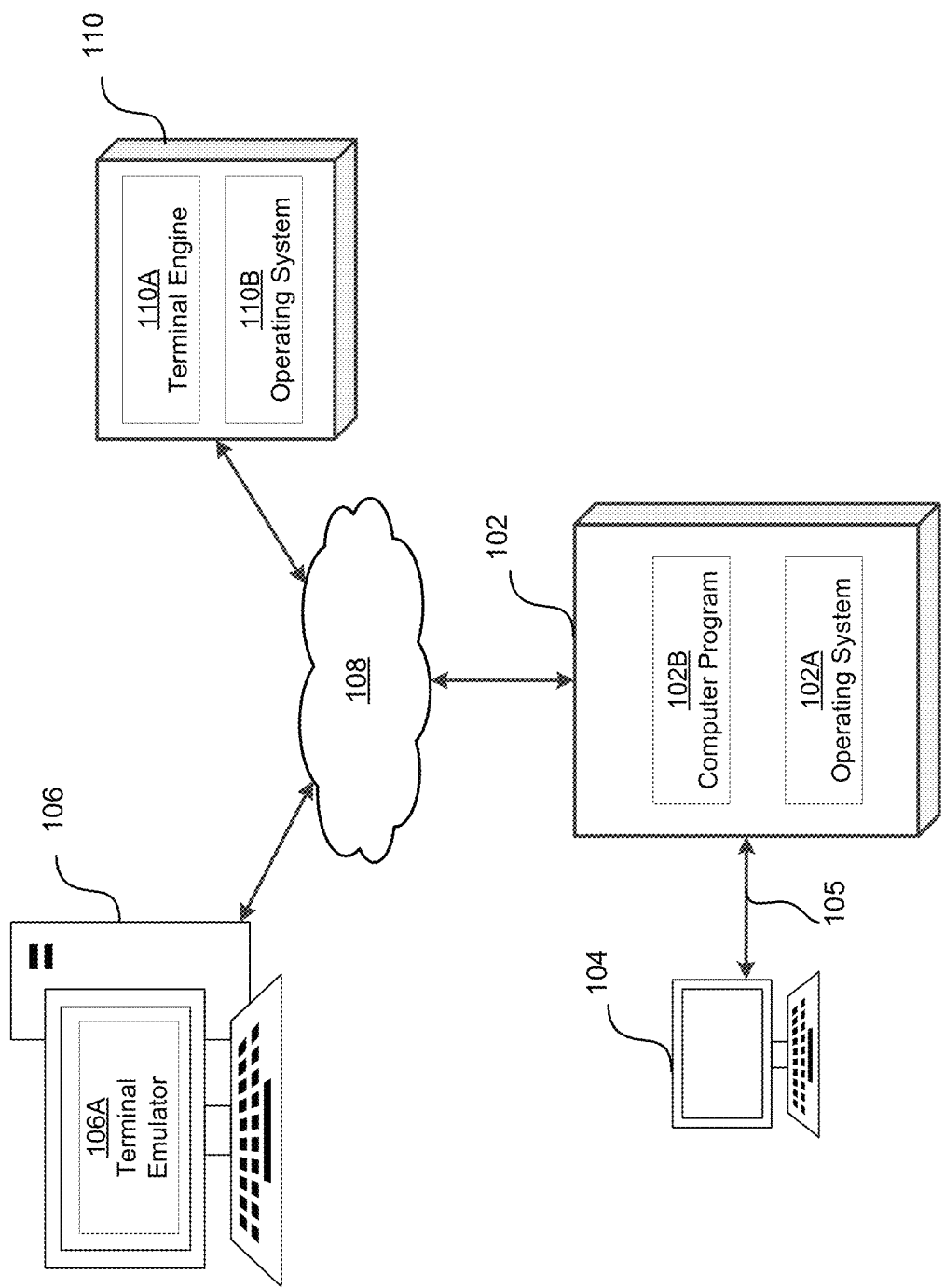
FIG. 1A is a diagram of an illustrative system in which some embodiments of the technology described herein may operate.

A computer program with a text-based UI may be controlled in a number of ways as described with reference to FIG. 1A, which shows a computer program 102B resident on a computing device 102 that may be controlled via a text-based UI. Examples of such computer programs include, but are not limited to, mainframe applications running on mainframe computers, such as, IBM zSeries, System z9, and System z10 servers, and/or other mainframe computers. Operating system 102A may manage computational resources of the computing device 102 and provide services to other computer programs, such as computer program 102B. Operating system 102A may include a mainframe operating system, such as, z/OS, Linux, or any other mainframe operating system.

One way of controlling the computer program 102B involves manual control using a console 104 (e.g., by a user physically sitting at and interacting with the console), where the console 104 may be connected to computing device 102 via a serial communication interface 105.

Another way of controlling the computer program 102B involves use of terminal emulation software program 106A (hereinafter, terminal emulator 106A) running on a remote computing device 106 (e.g., a desktop computer) remote from the computing device 102. The terminal emulator 106A emulates the text-based UI screen associated with the computer program 102B at the remote computing device 106 and allows a user, sitting at the remote computing device 106, to remotely control the computer program 102B from the remote computing device 106. Information associated with the UI screen is communicated between the computing devices 102, 106 via a network 108, which may be any suitable type of network (e.g., local area network, wide area network, Internet, corporate intranet, ad-hoc network, etc.)

Some conventional techniques for programmatically controlling computer programs with text-based UIs using a terminal emulator involve taking screenshots of the emulated UI screen and employing image recognition and/or character recognition techniques to read information from the emulated screen. The inventors have recognized that these techniques are error prone and do not provide information about the emulated screen that is needed for effective and accurate control of computer programs having text-based user interfaces.

In contrast to conventional techniques for programmatically controlling computer programs with text-based UIs that involve applying image processing techniques to screens generated by a terminal emulator, the inventors have developed techniques for programmatically controlling such computer programs (e.g., computer program 102B) that are different from and do not involve use of image processing techniques. Instead, the techniques developed by the inventors involve running a terminal engine software program 110A (hereinafter, terminal engine 110A) at a remote computing device 110 and communicates with the computing device 102 using a synchronous terminal protocol (and without the use of a terminal emulator). The terminal engine 110A accesses a string comprising a stream of characters indicative of content of the UI screen of the computer program 102B. The terminal engine 110A accesses this string by establishing a connection with the computing device 102 using the synchronous terminal protocol via the network 108. The terminal engine 110A generates a two-dimensional (2D) representation of the UI screen based on the string, which is then used to parse and navigate the UI screen to identify controllable user interface elements in the UI screen and programmatically control the computer program 102B to perform one or more actions via the identified controllable user interface elements.

Some embodiments of the technology described herein address some of the above-described drawbacks of conventional techniques for programmatically controlling computer programs with text-based UIs to perform tasks. However, not every embodiment addresses every one of these drawbacks, and some embodiments may not address any of them. As such, it should be appreciated that aspects of the technology described herein are not limited to addressing all or any of the above-described drawbacks of conventional techniques for programmatically controlling computer programs with text-based UIs to perform tasks.

Figure 2:
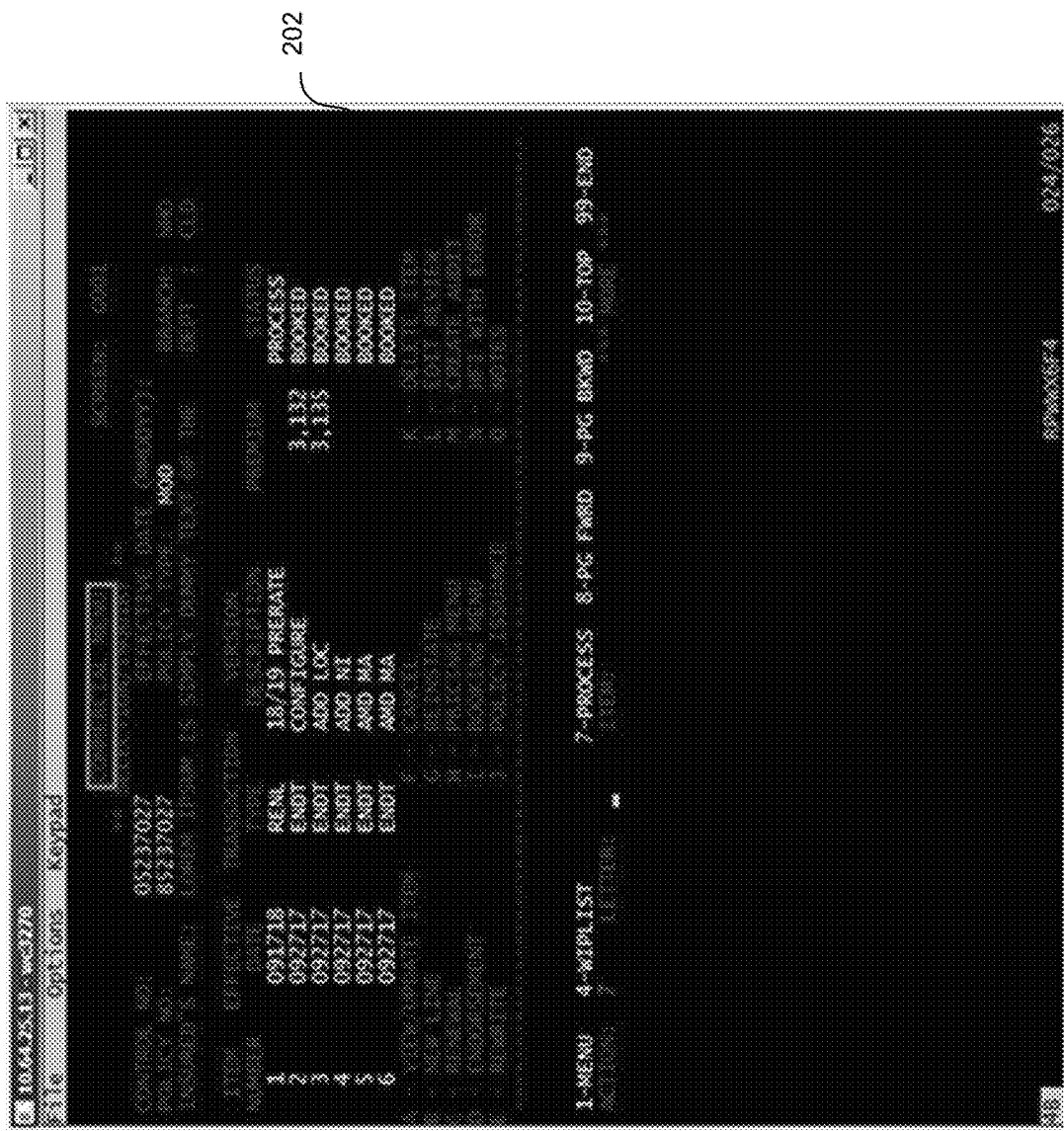
FIG. 2 is a screen shot of an illustrative text-based user interface screen, in accordance with some embodiments of the technology described herein.

Accordingly, some embodiments provide for techniques for programmatically controlling computer programs (e.g., computer program 102B) with text-based UIs by directly communicating with a computing device (e.g., computing device 102) running the computer program using a synchronous terminal protocol. In some embodiments, programmatically controlling such computer program(s) involves accessing a string (e.g., string 302 depicted in FIG. 3) specifying content of a UI screen (e.g., UI screen 202 depicted in FIGS. 2 and 6) of a computer program (e.g., computer program 102B) configured to be controlled via a text-based user interface; generating, based on the string, a 2D representation of the UI screen (e.g., 2D representation depicted in FIGS. 4A, 4B, 5); identifying a first controllable UI element (e.g., represented by a key-value pair or a table as shown in FIG. 6) in the UI screen at least in part by processing text in the 2D representation of the UI screen; and controlling the computer program by causing, via the first controllable UI element, the computer program to perform at least one action (e.g., getting information regarding rows in a table, setting a value corresponding to a key in a key-value pair, etc.) in furtherance of a task.

In some embodiments, the 2D representation includes information indicating the x- and y-coordinates of one or more text elements (e.g., a character, a word, a sentence, a phrase, etc.) in the UI screen.

In some embodiments, the string comprises a sequence of encoded characters that are encoded in accordance with a CP1140 character encoding.

In some embodiments, the computer program is a mainframe computer program.

In some embodiments, the accessing of the string and the controlling of the computer program is performed using a synchronous terminal protocol (e.g., the TN 3270 protocol).

In some embodiments, the accessing comprises connecting to a remote computer (e.g., computing device 102) executing the computer program using Transmission Control Protocol/Internet protocol (TCP/IP).

In some embodiments, generating the 2D representation comprises parsing the string to identify a plurality of fields and a respective plurality of coordinates (e.g., x- and/or y-coordinates) and using the plurality of fields and the respective plurality of coordinates to generate the 2D representation of the UI screen. In some embodiments, the parsing comprises for each field of the plurality of fields, identifying whether the field is editable. One example of the 2D representation shown in FIGS. 4A-4B comprises a plurality of rows, one or more rows of the plurality of rows corresponding to a field of the plurality of fields and including coordinates for the field. Another example of the 2D representation shown in FIG. 5 comprises a plurality of rows, each row of the plurality of rows including a set of fields having the same y coordinate in the UI screen. The 2D representation may be stored in a dictionary where keys are y coordinates.

In some embodiments, identifying a first controllable UI element comprises identifying a key-value pair (shown in FIG. 6, for example) using the 2D representation of the UI screen, the key-value pair comprising a key and a corresponding value.

In some embodiments, identifying a first controllable UI element comprises identifying a table (shown in FIG. 6, for example) using the 2D representation of the UI screen. Identifying the table may include identifying one or more table headings in the 2D representation of the UI screen; and identifying one or more rows corresponding to the one or more table headings in the 2D representation of the UI screen via one or more clustering techniques.

In some embodiments, controlling the computer program comprises using the first controllable UI element to set a value in the UI screen of the computer program. In examples where the first controllable UI element represents a key-value pair, setting the value comprises setting a value corresponding to the key. In examples where the first controllable UI element represents a menu comprising a plurality of options, setting the value comprises setting a value corresponding to an option of the plurality of options.

The inventors have also developed techniques for connecting to the computing device 102 and controlling the computer program 102B in a manner that allows the state of the UI screen 202 to be recovered even after some activity caused the network connection to be disrupted (e.g., a system crash, an error associated with the terminal engine 110A, etc.). This allows the programmatic control of the computer program 102 to be resumed from the point right before the disruption occurred.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

As described above with respect to FIG. 1A, the inventors have developed a system in which a computer program with a text-based UI, such as computer program 102B may be programmatically controlled via another computer program (e.g., terminal engine 110A) executing on a computing device 110 located remote from the computing device 102 on which the computer program 102B executes. In some embodiments, the computer program 102B may be a mainframe computer program or application and the computing device 102 is a mainframe computer. The terminal engine 110A may be configured to communicate with the computing device 102 via network 108. Network 108 may be a local area network, a wide area network, a corporate Intranet, the Internet, any suitable combination thereof, and/or any other suitable type of network. Network 108 may include wired links and/or wireless links, as aspects of the technology described herein are not limited in this respect. The terminal engine 110A may be configured to connect to computing device 102 executing the computer program 102B using Transmission Control Protocol/Internet protocol (TCP/IP).

In some embodiments, the computer program 102B may be configured to be controlled using a synchronous terminal protocol (e.g., TN 3270 protocol). In some embodiments, the computer program 102B may be configured to be controlled by connecting to the computing device 102 using the TN 3270 protocol that uses TCP/IP. In some embodiments, a synchronous terminal protocol may be configured to operate in a "screen-at-a-time" or block mode, whereby multiple changes made to a text-based UI of the computer program 102B are communicated to terminal engine 110A in a single action. The terminal engine 110A communicates with the computing device 102 using the synchronous terminal protocol. In some embodiments, the synchronous terminal protocol may be a protocol for controlling terminal selected from the group consisting of VT52, VT100, VT220, VT320, IBM 3270/8/9/E, IBM 5250, IBM 3179G, Data General D211, Hewlett Packard HP700/92, Sperry/Unisys 2000-series UTS60, Burroughs/Unisys A-series T27/TD830/ET1100, ADDS ViewPoint, Sun console, QNX, AT386, SCO-ANSI, SNI 97801, Televideo, and Wyse 50/60.

In some embodiments, the terminal engine 110A may be configured to connect to a terminal output stream associated with a text-based UI (e.g., text-based UI screen 202 shown in FIG. 2) of the computer program 102B through a specified (e.g., IP) address and port. The terminal engine 110A may obtain the terminal output stream using application programming interfaces (APIs) defined by a library (e.g., Python py3270) that provides an interface for communicating with the computing device 102. The terminal engine 110A may also obtain coordinates associated with one or more text elements (e.g., characters, words, symbols, phrases, sentences, etc.) in the terminal output stream using the APIs. The terminal engine 110A may be configured to control the computer program 102B using the information obtained via the APIs, as described herein.

Figure 1B:
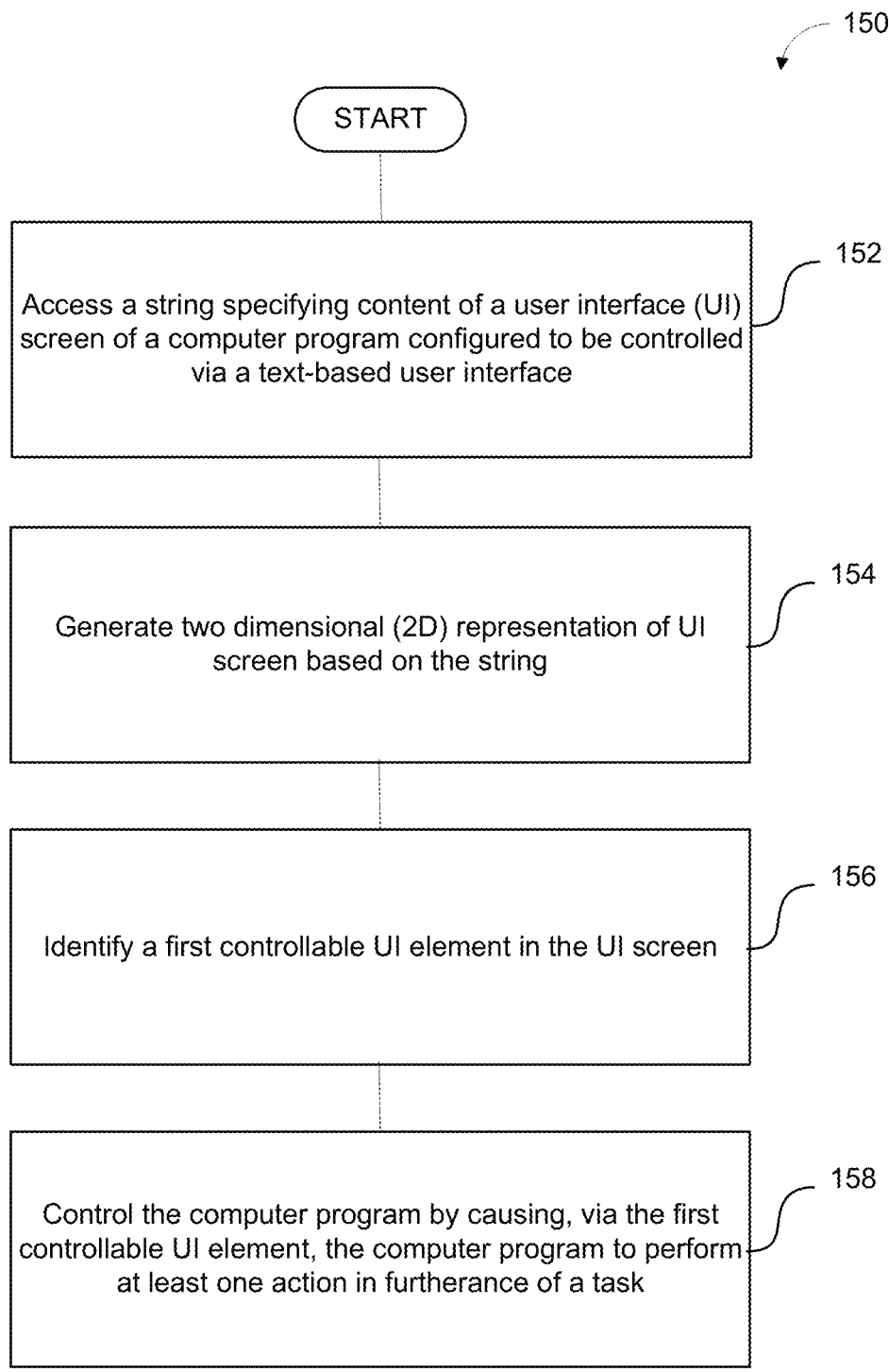
FIG. 1B is a flowchart of an illustrative process for programmatically controlling computer programs that are configured to be controlled via text-based user interfaces, in accordance with some embodiments of the technology described herein.

FIG. 1B is a flowchart of an illustrative process 150 for programmatically controlling computer programs (e.g., computer program 102B) that are configured to be controlled via text-based UIs, in accordance with some embodiments of the technology described herein. Process 150 may be executed using terminal engine 110A described with reference to FIG. 1A. Process 150 may be executed using any suitable computing device(s), as aspects of the technology described herein are not limited in this respect.

Figure 3:
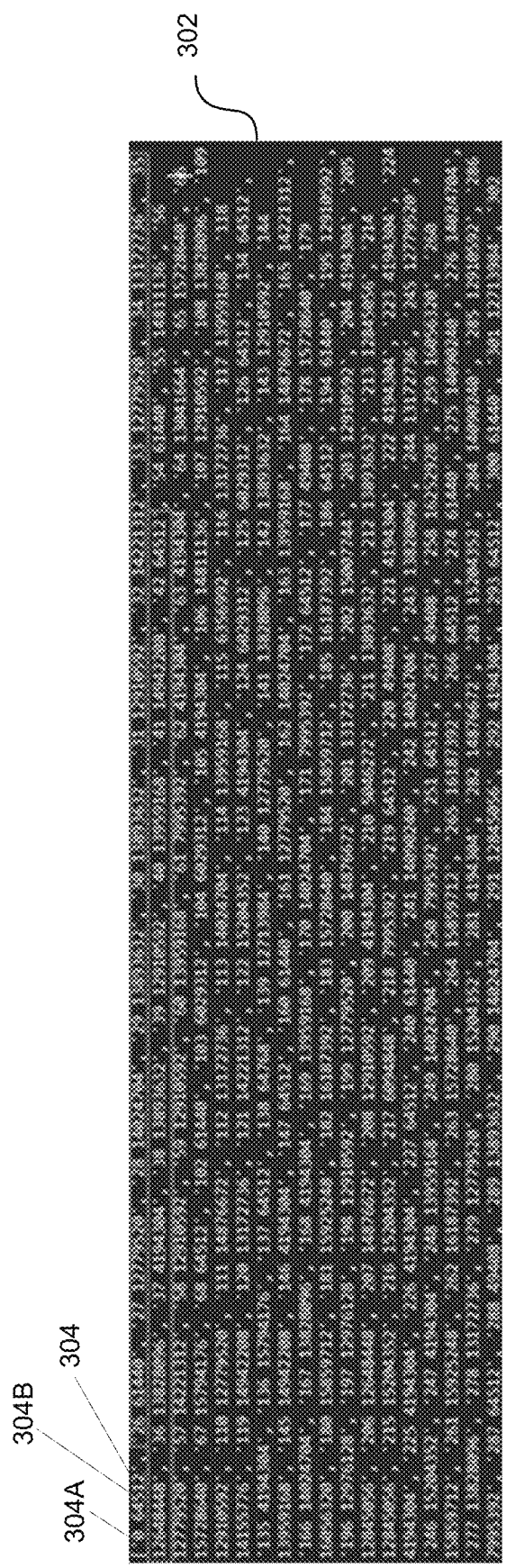
FIG. 3 shows an example string that represents a terminal output stream specifying content of at least a portion of the illustrative user interface screen of FIG. 2, in accordance with some embodiments of the technology described herein.

Process 150 begins at block 152, where a string specifying content of the UI screen 202 associated with the computer program 102B is accessed. FIG. 3 shows an example string 302 that represents a terminal output stream specifying content of the UI screen 202. The string 302 includes a sequence of encoded characters. These characters may represent the data presented on the UI screen 202 and/or one or more demarcation characters. The one or more demarcation characters may represent special characters that denote the beginning and/or end of a field on the UI screen 202. A field may include one or multiple characters, one or multiple words, one or more sentences, and/or any combination of alphanumeric (and/or special) characters.

As shown in FIG. 3, the string 302 includes a sequence of encoded characters along with their index position in the UI screen 202. Each entry 304 in the terminal output stream 302 includes two parts, one part 304A specifying the index position of a character of the UI screen 202 and the other part 304B representing the character encoded using the CP1140 character encoding. For example, the entries—'26 61440', '27 12779520', '28 14024704', '29 13893632', '30 13893632', '31 14221312', '33 12779520', '34 13172736', '35 12648448', '36 13828096', '37 4194304', '38 13893632', '39 12910592', '40 13959168', '41 14942208', '42 64512'—shown in FIG. 3 correspond to the text "COMMERCIAL MENU" in UI screen 202 of FIG. 2.

Next, process 150 proceeds to block 154, where a 2D representation of the UI screen 202 is generated based on the string 302. The 2D representation includes information representing the content and layout of the UI screen 202. In some embodiments, the terminal engine 110A may be configured to process (e.g., parse) the string 302 to identify a number of fields and their respective coordinates in the UI screen 202. In some embodiments, processing the string 302 to identify one or more fields and their respective coordinates may be performed at least in part by identifying one or more demarcation characters in the string 302. In some embodiments, processing the string 302 to identify one or more fields (e.g., a field "COMMERCIAL MENU") may be performed as follows, although the disclosure is not limited in this respect:

Step 1—Traverse through each character in the string and decode the character using the CP1140 format.

Step 2—Concatenate the decoded characters starting from the first occurrence of a "start field" demarcation character to a "end field" demarcation character. For example, in FIG. 2, the entry starting with '26 61440' indicates that an encoded value "61440" is at index 26. Because '61440' represents the "start field" character that marks the start of a text field, all entries starting from index 27 through index 42 are read, decoded, and concatenated to generate a field. In some embodiments, a temporary variable "field_var" may be initialized with a starting index 27 and all the decoded values through index 42 may be concatenated into the temporary variable "field_var". The encoded value "64512" at index 42 represents the "end field" character that marks the end of the text field, therefore, the concatenation of decoded characters ends when this "end field" character is encountered. At the end of the concatenation, a field "COMMERCIAL MENU" is identified from the string 302. In this case, the variable "field_var" has the value "COMMERCIAL MENU".

Step 3—Repeat steps 1 and 2 until all the characters in the string have been traversed and corresponding fields have been identified. In some embodiments, certain demarcation characters may be used to identify if the field is editable.

Figure 4A:
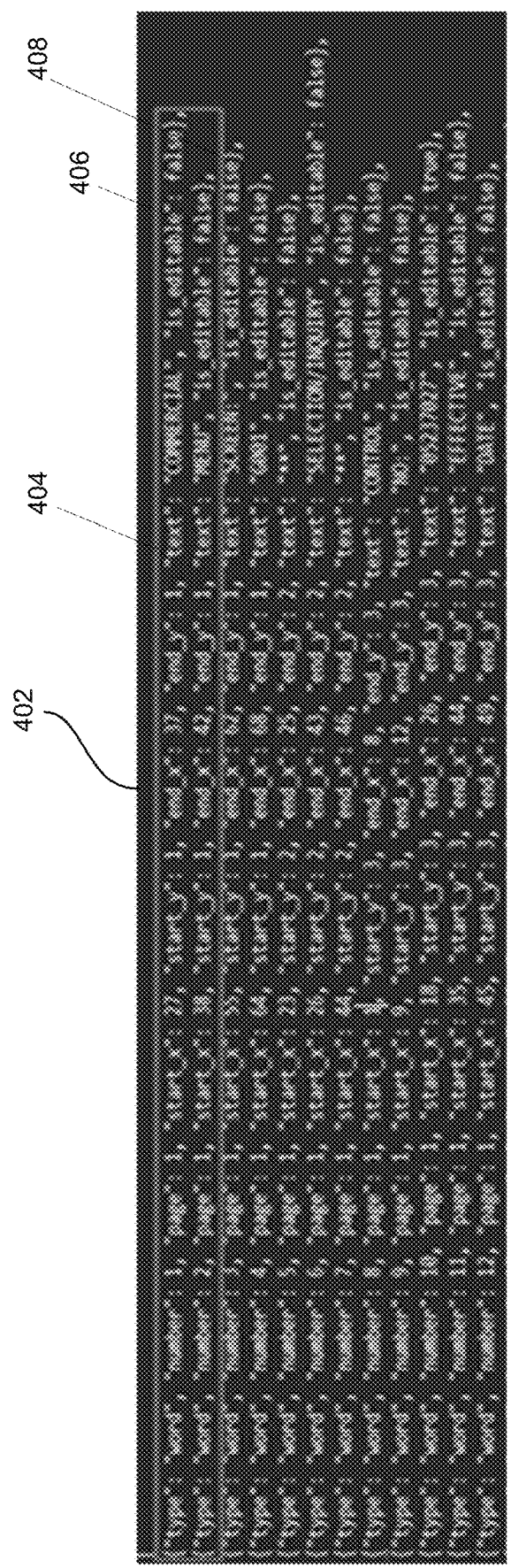
FIGS. 4A and 4B shows portions of an example two dimensional representation of at least a portion of the illustrative user interface screen of FIG. 2, in accordance with some embodiments of the technology described herein.
Figure 4B:
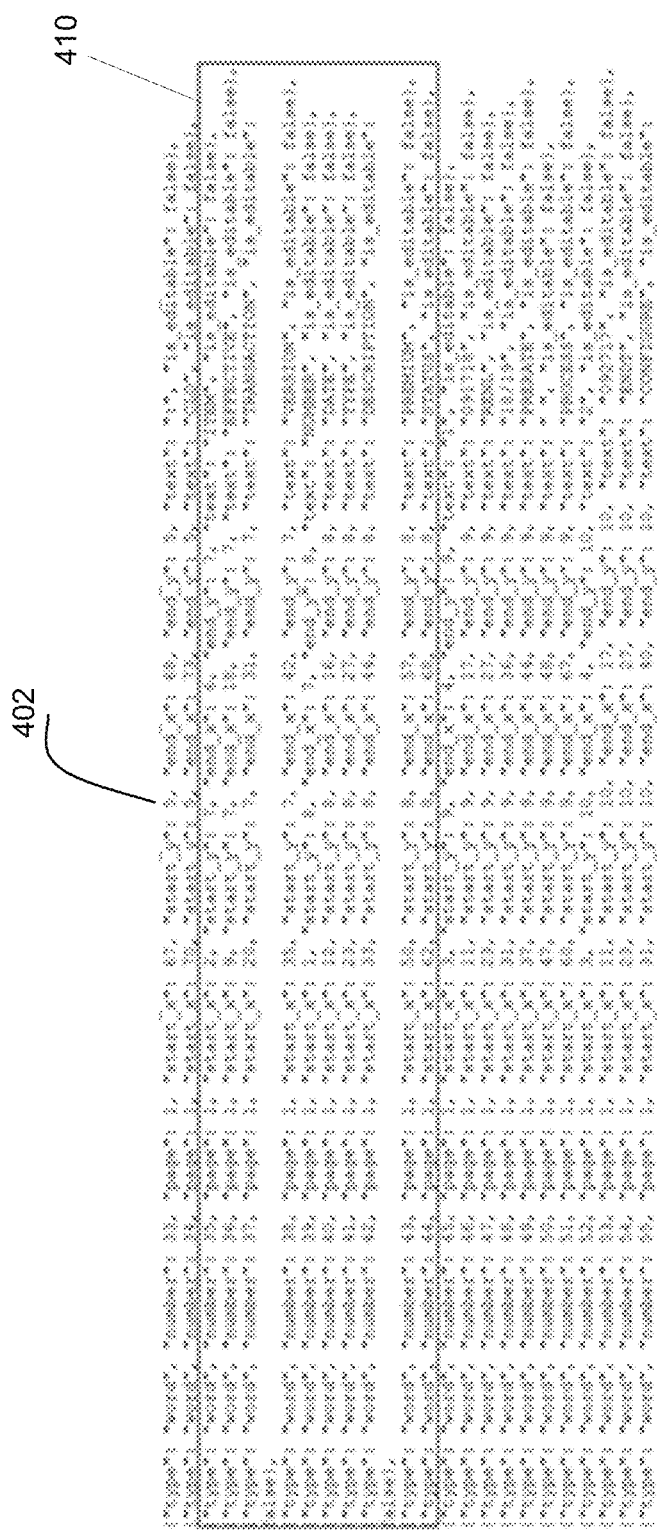

In some embodiments, the terminal engine 110A may be configured to associate coordinates (e.g., x- and/or y-coordinates) obtained using the APIs with the identified field(s). In some implementations, the coordinates may be derived from the index positions in the string 302. The terminal engine 110A may generate a 2D representation of the UI screen 202 based on the identified fields and their respective coordinates. FIGS. 4A and 4B depict portions of an example 2D representation 402 of the UI screen 202 that may generated based on the string 302 and/or fields and coordinates identified from the string 302. For example, FIG. 4A depicts a first portion of the 2D representation 402 corresponding to the first couple of lines of the UI screen 202 and FIG. 4B depicts a second portion of the 2D representation 402 corresponding a portion of the table in the UI screen. In some embodiments, the 2D representation 402 may include a number of rows, where one or more of the number of rows correspond to a field and include coordinates for the field. In one embodiment, the 2D representation 402 may be generated by generating a word map that includes information associated with the identified fields. In some embodiments, the word map contains a list of dictionaries, where each dictionary includes content of a field, coordinates for the field, and a key named "editable" that indicates whether the field is editable. For example, if the field is editable, the value of the key is true, whereas if the field is not editable, the value of the key is false. In some embodiments, generating the word map may be performed as follows, although the disclosure is not limited in this respect:

Step 1—Split a field into multiple words when the field includes a space between the words. For instance, using the spaces within the variable field_var, the field may be split into multiple words, while calculating the x and y coordinates for their start and end coordinates based off the maximum line length (e.g., 80 characters) of the UI screen by using the start index (e.g., index 26) for the variable field_var as an anchor point. Therefore, the field "COMMERCIAL MENU" may be split into two words "COMMERCIAL" and "MENU", where the start and end coordinates for "COMMERCIAL" are (27, 1) and (37, 1) respectively, and the start and end coordinates for "MENU" are (38, 1) and (42, 1) respectively.

Step 2—Add the two words and their metadata (e.g., text, start and end coordinates, and/or other information) into the word map.

Step 3—Repeat steps 1 and 2 to generate the word map for the UI screen 202 including a list of dictionaries, where each dictionary corresponds to a field and includes information associated with the field (e.g., the number of words contained in the field, text associated with the words, coordinates associated with the words, and a key indicating whether the field is editable). In some embodiments, separate dictionaries may be created for each word of the field and information associated with each word may be stored in the respective dictionary. For example, each dictionary in the list of dictionaries may correspond to a word and includes information associated with the word (e.g., text associated with the word, coordinates associated with the word, and a key indicating whether the field (from which the word is identified) is editable, and/or other information).

FIGS. 4A and 4B depict an example 2D representation 402 of the UI screen 202 that represents the word map. For example, the first row 404 of the 2D representation 402 depicts an entry corresponding to the word "COMMERCIAL" of the field "COMMERCIAL MENU" that includes information associated with the word "COMMERCIAL". The second row 406 of the 2D representation 402 depicts an entry corresponding to the word "MENU" of the field "COMMERCIAL MENU" that includes information associated with the word "MENU". In addition, a number of rows 410 of the 2D representation depict entries corresponding to words associated with table headings of the table in the UI screen 202. As will be appreciated, the 2D representation may include a number of other rows that correspond to other words in the UI screen 202. It will be further appreciated that the use of "word" herein is understood to encompass any combination or sequence of alphanumeric characters (e.g., 'SCREEN:'; 'G001'; '**', etc.).

Figure 5:
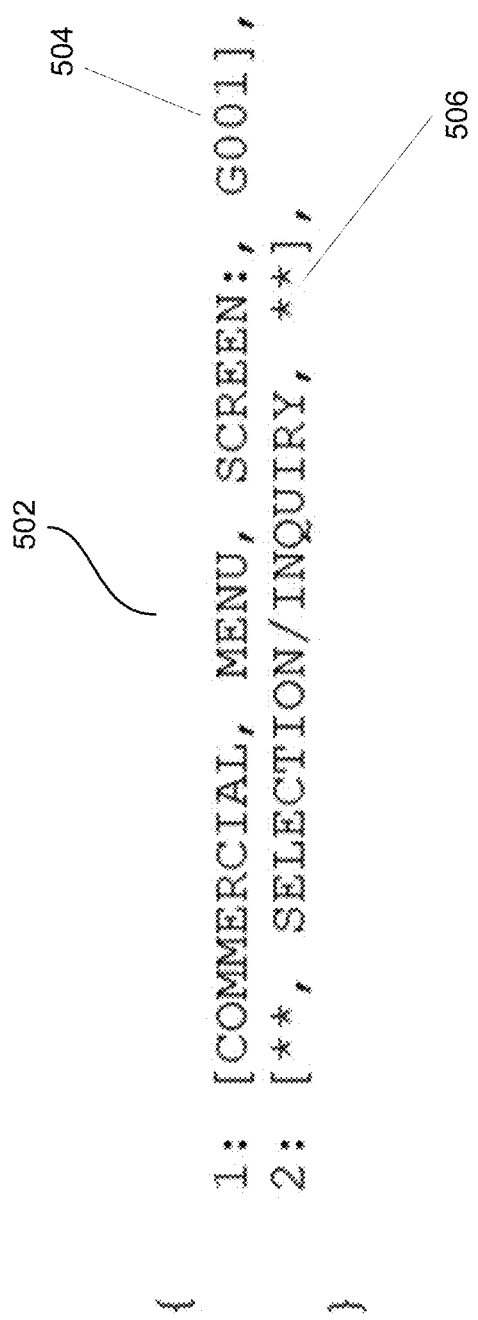
FIG. 5 shows another example two dimensional representation of at least a portion of the illustrative user interface screen of FIG. 2, in accordance with some embodiments of the technology described herein.
Figure 6:
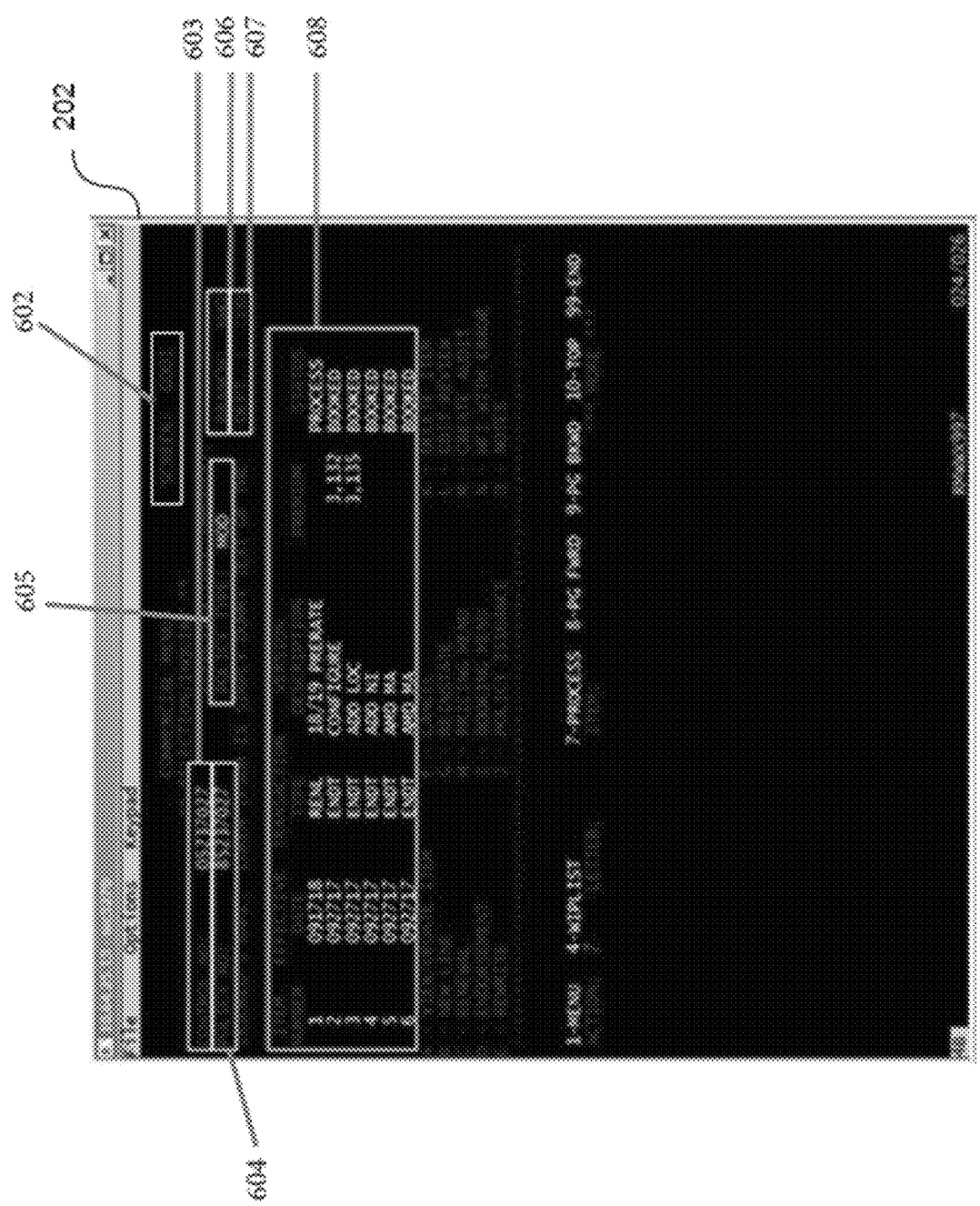
FIG. 6 is screenshot of the user interface screen that shows a number of controllable UI elements in the illustrative user interface screen of FIG. 2, in accordance with some embodiments of the technology described herein.

FIG. 5 depicts another example 2D representation 502 of the UI screen 202 that is generated based on the string 302 or fields and coordinates identified from the string 302. In particular, FIG. 5 depicts rows corresponding to the first two lines of the UI screen 202. The 2D representation 502 may include a number of rows, where each row includes a set of fields having the same y coordinate in the UI screen 202. The 2D representation 502 may be stored in a dictionary where keys are y coordinates.

In some implementations, the 2D representation 502 may be generated using the word map described above. In some embodiments, generating the 2D representation using the word map may be performed as follows, although aspects of the disclosure are not limited in this respect:

Step 1—Identify a list of words from the word map that have the same y coordinates. For example, 'COMMERCIAL', 'MENU', 'SCREEN:', and 'G001' may be identified as all having the same y coordinate '1'.

Step 2—Store the list of words in a dictionary where keys are y coordinates stored in ascending order. The words are stored in ascending order of their start x coordinates. In some implementations, each of the words may be stored in a dictionary as explained above, where each dictionary includes information associated with the word (e.g., text associated with the word, coordinates associated with the word, and a key indicating whether the field (from which the word is identified) is editable).

Step 3—Repeat steps 1 and 2 to identify and store the list of words for all the y coordinates.

Step 4—Generate the 2D representation 502 including a number of rows, each row corresponding to a y coordinate used as a key in the dictionary. For example, FIG. 5 depicts the 2D representation 502 including two rows 504, 506 corresponding to y coordinates '1' and '2'. The value on each coordinate is a list of words that have the corresponding y coordinate as their mid coordinates in the word map and are listed in ascending order of their start x coordinates. For example, the first row 504 of the 2D representation 502 corresponds to the y coordinate '1' and includes a list of words, such as, 'COMMERCIAL', 'MENU', 'SCREEN:', and 'G001' having that y coordinate. Also, the second row 506 of the 2D representation 502 corresponds to the y coordinate '2' and includes a list of words, such as, '', 'SELECTION/INQUIRY, and '' having that y coordinate. Similarly, other rows following the first two rows that correspond to the other y coordinates in the word map and the associated list of words may be represented in the 2D representation 502 without departing from the scope of this disclosure.

Although information regarding the fields/words is described herein as being stored in dictionaries, any other data structure may be used to store this information as the disclosure is not limited in this respect. In addition, any form of 2D representation (not limited to 2D representations 402, 502) may be generated and used without departing from the scope of this disclosure as long as the 2D representation includes information that represents the content and layout of the UI screen such as, content of fields, coordinates of the fields, and keys indicating whether the field is editable.

Next, process 150 proceeds to block 156, where controllable UI elements in the UI screen 202 may be identified at least in part by processing text in the 2D representation 402, 502 of the UI screen 202. Examples of controllable UI elements may include key-value pairs, tables, menus, checkboxes, and/or other selectable or controllable UI elements. FIG. 6 shows the UI screen 202 of FIG. 2 with a number of controllable UI elements 602-608. Controllable UI elements 602-607 correspond to key-value pairs in the UI screen 202 and controllable UI element 608 corresponds to a table in the UI screen 202. Controllable UI elements 602-608 of the UI screen 202 may refer to UI elements that may be used to programmatically control the computer program 102B to perform various actions (e.g., reading or writing to the UI screen) that correspond to a task. For example, a task may involve obtaining details of an insurance policy from a text-based UI screen 202 of the computer program 102B. To accomplish this task at least two actions may be performed. A first action may involve entering a value of policy number for which information is desired and a second action may involve getting a summary of transactions for that policy number. In this example, the terminal engine 110A may identify a first controllable UI element 605 corresponding to the key-value pair associated with the key "POLICY NO:" and identify a second controllable UI element 608 corresponding to the table that includes the summary of the transactions.

Figure 7:
FIG. 7 shows a pointer to a user interface element that represents a key-value pair in the illustrative user interface screen of FIG. 2, in accordance with some embodiments of the technology described herein.
Figure 8:
FIG. 8 shows a pointer to a user interface element that represents table headings and rows for a table in the illustrative user interface screen of FIG. 2 in accordance with some embodiments of the technology described herein.

In some embodiments, the terminal engine 110A exposes APIs to obtain pointers to the controllable UI elements on the UI screen 202. For example, FIG. 7 depicts a pointer to the UI element 602 corresponding to the key-value pair "SCREEN" and "G001". As another example, FIG. 8 depicts a pointer to the UI element 608 corresponding to the table shown in FIG. 6. Because the 2D representation 402, 502 of the UI screen 202 contains a non-hierarchical representation of words and their coordinates, the inventors have recognized that there may be instances where the terminal engine 110A is unable to distinguish between UI elements that represent a table versus UI elements that represent key-value pairs. To address this challenge, the inventors have developed techniques that involve using rules based on visual alignment and distances between words to understand the layout of the UI screen and segment the UI screen into a number of segments/elements corresponding to key-value pairs, tables, or other UI elements. Once the various controllable UI elements are identified, information may be read from and/or written to the UI elements or portions of the UI elements. The process 150 proceeds to block 158, where the computer program 102B is programmatically controlled to perform one or more actions (e.g., reading information from the screen, writing information to the screen, select elements (such as menus) on the screen, moving to a certain location on the screen etc.) via the identified UI elements or segments. Some aspects of the technology described herein may be understood further based on the non-limiting illustrative embodiments described below.

A. Examples of APIs Exposed by the Terminal Engine 110A and Manner of Identifying Controllable UI Elements To override any of the above parameters, a "config" argument may be passed to any API of the terminal engine 110A. The "config" argument may be a dictionary where keys are names of the parameters to be overridden and values are the new values of the corresponding parameters. An example of an API command with the "config" argument is shown below:

terminal.get_table(["HEADING 1", "HEADING 2"],
config={"max_y_distance_cutoff": 8, "cluster_x_distance": 5})

I. get_key_value

In some embodiments, the get_key_value API allows searching for a key in the 2D representation 402, 502 and extracting the value that corresponds to the key (e.g., a value that is beside or below the key in the UI screen). In some embodiments, the value for a given key is determined based on alignment of words and the start and end of the value is determined based on distances between words.

For example, in order to obtain a value for a corresponding key (e.g., 'SCREEN:'), the key may be provided as a variable in the command—terminal.get_key_value ("SCREEN:"). In response to this command, the terminal engine 110A parses the 2D representation 402, 502 to identify one or more words that match the key and the corresponding value for the key. The output of the command is shown in FIG. 7. The command returns a pointer to the UI element 602 corresponding to the key-value pair "SCREEN: G001". The pointer includes information associated with the key and the corresponding value. This information is retrieved from the dictionary described above. For example, a row 408 (shown in FIG. 4A) corresponding to the key 'SCREEN:' may be identified in the 2D representation 402 and information from the dictionary corresponding to the key may be retrieved and presented as shown in FIG. 7.

In some embodiments, searching for the key in the 2D representation may be performed as described below, although the disclosure is not limited in this respect. In some

| API | Input and Output of API |
|---|---|
| get_key_value | This API takes a key as input and returns a pointer to a UI element or segment that represents the corresponding key-value pair |
| get_multiple_key_values | This API takes a list of keys as input and returns a list of pointers to UI elements or segments that represent corresponding key-value pairs |
| get_table | This API takes a list of headings of a table as input and returns a pointer to a UI segment or element that represents the corresponding table headings and rows |
| get_menu | This API returns a pointer to a UI segment or element that represents the menu |
| set_value | This API allows writing a value to the UI screen using a pointer to a UI segment as a reference or anchor |

Various parameters used in the description below corresponding to different thresholds may be globally defined in the terminal engine 110A. The value of these parameters may be overridden (e.g., by the user) while making API calls. An example list of the global parameters and their default values is provided below:

max_x_distance_cutoff_for_key=2
max_y_distance_cutoff_for_key=2
max_x_distance_cutoff=3
max_y_distance_cutoff=2
min_left_distance=1
min_right_distance=1
cluster_x_distance=1 embodiments, the 2D representation 402, 502 may be used to identify words that match the key. For example, each line of the UI screen may be parsed from top to bottom using the 2D representation and the words present on the line may be matched with the key. The key may appear in one line or span across multiple lines. So if some words on a line match a prefix of the key then continue search in the next line. FIG. 10 shows three examples of how a key "GROSS TOTAL INCOME:" can appear on screen.

In case of searching a key made of multiple words, two words on a line whose distance is more than a first threshold (e.g., max_x_distance_cutoff_for_key) or two lines whose distance is more than a second threshold (e.g., max_y_distance_cutoff_for_key) may not considered to be part of one key. FIG. 11 shows two examples of invalid keys because the inter-word distance (i.e., the first threshold) and the inter-line distance (e.g., the second threshold) is above the cutoff.

In some embodiments, the text of the key may appear in a sentence on the UI screen, and shouldn't be classified as key. To avoid such classification, the key should at least be a third threshold (e.g., min_left_distance) apart and a fourth threshold (e.g., max_right_distance) apart from its immediate left and right word respectively. The right distance check (i.e., fourth threshold check) may be ignored if the key ends with ":", "-", "—". FIG. 12 shows an example of an invalid key because the text "GROSS TOTAL INCOME" does not have the minimum distance from its neighboring words.

In some embodiments, searching for the value corresponding to the key in the 2D representation may be performed as described below, although the disclosure is not limited in this respect. In some embodiments, the 2D representation 402, 502 may be used to identify the value corresponding to the identified key. In some embodiments, the value may be searched beside the key. In some embodiments, each line of the screen starting from line where key starts may be parsed using the 2D representation 402, 502 and the words that are located to the right of the key are read.

In some embodiments, the value may span across more lines than the key does. So, the words from lines that are below the key are also read until an end value criteria is met. To find the end of the value, the distances between words and lines may be used. For example, two words on a line whose distance is more than a fifth threshold (e.g., max_x_distance_cutoff) or two lines whose distance is more than a sixth threshold (e.g., max_y_distance_cutoff) are not considered to be part of one value. FIG. 13 shows an example of a key-value pair with key "ADDRESS:". The word "DATE" is ignored because it is located more than the cutoff distance from the address value. The line "SUMMARY" is ignored and marks end of the value because it is located more than the cutoff distance from the address value.

II. get_multiple_key_values

In some embodiments, the get_multiple_key_values API allows searching for multiple keys in the 2D representation 402, 502 and extracting values corresponding to the keys (e.g., a value that is beside or below the respective key in the UI screen). In some embodiments, the searching for keys may be performed in a manner similar to the "get_key_value" API. In some embodiments, the values corresponding to the keys may also be searched in a similar manner albeit with one difference. Because terminal engine 110A has knowledge of multiple keys that are provided as variables in the command terminal.get_multiple_key_values, the terminal engine 110A uses the keys to find end of values along with using distances. So while searching for a value, if the search runs into another key then the search is stopped. FIG. 14 shows an example of three key-value pairs with keys "TOTAL:", "DATE:" and "TAX:" respectively. In the value of "TOTAL:", the words "DATE:" and "TAX:" are not included despite them being close to "100" because they themselves are classified as keys. Therefore, the terminal engine 110A is able to find a correct end of value of "TOTAL:".

III. get_table

In some embodiments, the get_table API allows searching for table headings in the 2D representation 402, 502 and parses the rows that appear below the headings. The terminal engine 110A applies distance-based clustering techniques on words of lines below the table headings to find column boundaries. The end of the table is determined based on various factors, such as, distance of the line outside the table with the last row, alignment of columns of table not matching with the line outside the table, and format of values in a column not matching with the line outside the table.

In order to get rows of the table shown in FIG. 6, a list of headings of the table may be provided as variables in the command terminal.get_table.

terminal.get_table(["ITEM NUMBER", "EFFECTIVE DATE", "TRANSACTION TYPE", "VERSION DESCRIPTION", "PREMIUM", "STATUS"]).

In response to this command, the terminal engine 110A parses the 2D representation 402, 502 to identify one or more words that match the table headings. The output of the command is shown in FIG. 8. The command returns a pointer to a UI element 608 that represents the table headings and the rows of the table. The pointer may include information, such as, content and coordinates of the table. This information is retrieved from the dictionary described above. For example, entries/rows 410 corresponding to the table headings may be identified in the 2D representation 402 and information from the dictionary corresponding to the table headings may be retrieved and presented as shown in FIG. 8.

In some embodiments, searching for the table headings in the 2D representation may be performed as described below, although the disclosure is not limited in this respect. In some embodiments, the 2D representation 402, 502 may be used to identify words that match the table headings. In some embodiments, each line of the screen from top to bottom may be parsed using the 2D representation 402, 502 and the words present on the line may be matched with the table headings. Each of the headings may appear in one line or span across multiple lines. So if some words on a line match prefixes of the headings, the search is continued into the next line.

The inventors have recognized that in some instances two neighboring headings may have common words that can make the heading search ambiguous. To address this, the inventors have developed a technique that allows multiple options to be considered before accurately matching the table headings. For example, every time a common word between two neighboring headings is encountered, the search forks into two branches—one considering the word to be in first heading and second considering the word to be in the second heading. FIG. 15 shows an example of table with three headings "AMOUNT PAID", "PAID TAX" and "TAX REMAINING". While parsing the first line, when the word "PAID" is encountered, the terminal Engine 110A might not be able to determine whether the word "PAID" is part of "AMOUNT PAID" or "PAID TAX". So, the terminal engine 110A forks the search into two branches and considers both options. Similar ambiguity arises when the terminal engine 110A encounters the word "TAX" in the first line, so the terminal engine 110A further forks the search into two branches for "TAX REMAINING" and "PAID TAX". If any one of the branches results in the words being successfully associated with all the headings, the terminal engine 110A discards the other branches. If on the other hand, none of the branches result in the words being associated with all the headings, the terminal engine 110A continues the search on the next line. In this manner, the terminal engine 110A is able to accurately associate words with the table headings and identify the table headings in the 2D representation of the UI screen based on information stored in the dictionary (e.g., coordinates, etc.)

In some embodiments, searching for rows corresponding to the table headings in the 2D representation may be performed as described below, although the disclosure is not limited in this respect. In some embodiments, the 2D representation 402, 502 may be used to identify the rows corresponding to the table headings using various clustering techniques. In some embodiments, searching for the rows corresponding to the table headings in the 2D representation may be performed as follows, although aspects of the disclosure are not limited in this respect:

1. The rows may be searched below the table headings. Each line of the screen starting from line right below the table headings may be parsed using the 2D representation 402, 502 and the words from the line may be read.
2. Using start x and end x coordinates of the table headings, a column may be assigned to each word of a line based on one or more clustering techniques, an example of which is provided below:
    i. Loop over each word and check if the word lies directly below a table heading of a column. If it does, put it in that column.
    ii. Loop over each word that is not assigned any column yet, calculate its distance on x axis from the nearest table heading and from the nearest word.
    iii. If the calculated distance from the nearest table heading is less than the calculated distance from the nearest word, then put the word in the column that the nearest heading belongs to.
    iv. If the calculated distance from nearest table heading is not less than the calculated distance from the nearest word, an assumption may be made that the current word belongs to the column to which the nearest word belongs to.
        If nearest word has been put in a column then put current word in that column
        If nearest word's nearest word is the current word itself, this means that the current word and the nearest word are relying on each other to know their column. In this case the current word and the nearest word are merged into a single word.
    v. If there are any words that have not been assigned a column then proceed to step ii.
3. In cases where the table has rows spanning multiple lines, the terminal engine 110A may retrieve the rows when the table has at least one column which is mandatory, for example, at least one column in which the value is not blank and does not span multiple lines. The terminal engine 110A may use the mandatory column as pivot to merge lines of each rows. The mandatory column may be provided (e.g., by a user) as a parameter along with the list of table headings while using the API. An example command where the mandatory column is specified is shown below:

--- terminal.get_table(["DATE", "DESCRIPTION"], table_config={"Mandatory Headings": ["DATE"]})

---

For example, in the table of FIG. 16, the texts "ROW 1 LINE 2" and "ROW 2 LINE 2" are merged with the texts listed above them respectively as the mandatory "DATE" column on those lines is blank which indicates to the terminal engine 110A that the line is not a new row.

4. End of the table may be determined based on a number of factors. For example, the end of the table may be determined if any of the following conditions is true:
    i. The distance between current line and previous line is more than the sixth threshold (e.g., max_y_distance_cutoff). For example, in the table of FIG. 17, the line "SUMMARY" is more than the cutoff distance apart from the last line of the table.
    ii. The data type of a value in a column is not as expected. To make this determination, column data types may be provided as parameters in the terminal.get_table command shown below.

---

Terminal.get_table(["DATE", "AMOUNT"], table_config={"Expected value": ["DATE": "date", "AMOUNT": "number"]})

---

Supported expected values associated with data types may include, but not be limited to, date, number, blank, regex (i.e., regular expression that can cover all forms of expected values and thus makes this comprehensive). FIG. 18 shows an example in which the word "SUMMARY" doesn't have the expected value for the date data type, thereby indicating the end of the table.
    iii. The line doesn't fit the layout of the table. A determination regarding whether the line fits the layout of the table may be made as follows, although the disclosure is not limited in this respect:
        Create clusters of words—A word falls in a cluster if any word in that cluster has distance smaller than cluster_x_distance.
        If x coordinates of any cluster overlaps with x coordinates of more than one table heading then end the table.
        For example, in the table of FIG. 19, the line "SUMMARY IS WRITTEN BELOW" forms one cluster and spans across both the columns, thereby indicating an end of the table.

The inventors have recognized that some tables may not have a regular tabular layout and instead may include headings and rows that are wrapped into multiple lines because they do not fit in one screen. Such tables are referred to herein as wrapped tables, an example of which is shown in FIG. 20. The wrapped table has five headings "ITEM", "CODE", "QUANTITY", "PRICE" and "AMOUNT". The first three headings are presented on one line and the remaining 2 headings are presented on the next line. Each row of the table follows the same pattern. The inventors have developed a technique that allows the terminal engine 110A to identify and extract the wrapped table by changing the manner in the which the table headings are provided as parameters in the terminal.get_table command also shown below. For example, the table headings may be provided as a list of lists of headings in the command.

--- terminal.get_table([["ITEM", "CODE", "QUANTITY"], ["PRICE", "AMOUNT"]])

---

In some embodiments, the headings and rows of the wrapped table may be identified by flattening the found headings by placing them in the same line having same y coordinates and extending x coordinates of the headings that have gotten wrapped into new lines. For example, if there are k (e.g., k=2 is the example above) list of headings provided as input to the terminal.get_table command, k lines may be read together while searching for rows corresponding to the headings. The words in the rows may be flattened by placing all the words in the lines on the same y coordinates by extending x coordinates of the words that have gotten wrapped into new lines. After the headings and rows are flattened, the table headings and the rows may be searched for in the 2D representation 402, 502 using a similar approach as described above with respect to a regular (not wrapped) table.

IV. get_menu

This API searches the 2D representation 402, 502 for menu items and returns a pointer to the UI segment or element that represents a menu containing the menu items.

V. set_value

The pointers to the UI segments or elements returned by the above-mentioned APIs contain information about the segments' coordinates that can be used to navigate to the appropriate segment and perform write operations on the UI screen. The set_value API allows writing a value to the UI screen 202 using the pointer to the UI segment returned by any of the above-mentioned APIs. The set_value API additionally accepts a set of commonly-used keystrokes (e.g., Tab), which allows writing anywhere near the anchor on the screen. This is because the pointers to the UI segments contain coordinate information that can be used to set a value at a desired location on the UI screen.

For example, in order to enter "85237027" as value of "POLICY NO:" field, followed by pressing the Tab key, the following commands can be utilized.

```
policy_no_obj=terminal.get_key_value("POLICY NO:")
terminal.set_value(policy_no_obj, value="85237027",
    keys_to_send=[Keys.Tab])
```

The first command returns a pointer to a UI segment or element that represents the key-value pair associated with the key "POLICY NO:". The second command uses the coordinate information (e.g., coordinates of the key and coordinates of the value) contained in the pointer to set the value for the key "POLICY NO:" and moves the cursor in response to the Tab Key.

In some embodiments, the set_value API may be used to set a value of a field in a table by specifying an anchor word and one or more key-strokes (e.g. Tab, Shift_Tab, etc.) that indicate how to navigate from the anchor word to set the appropriate value.

B. Additional Implementation Detail

Figure 9:
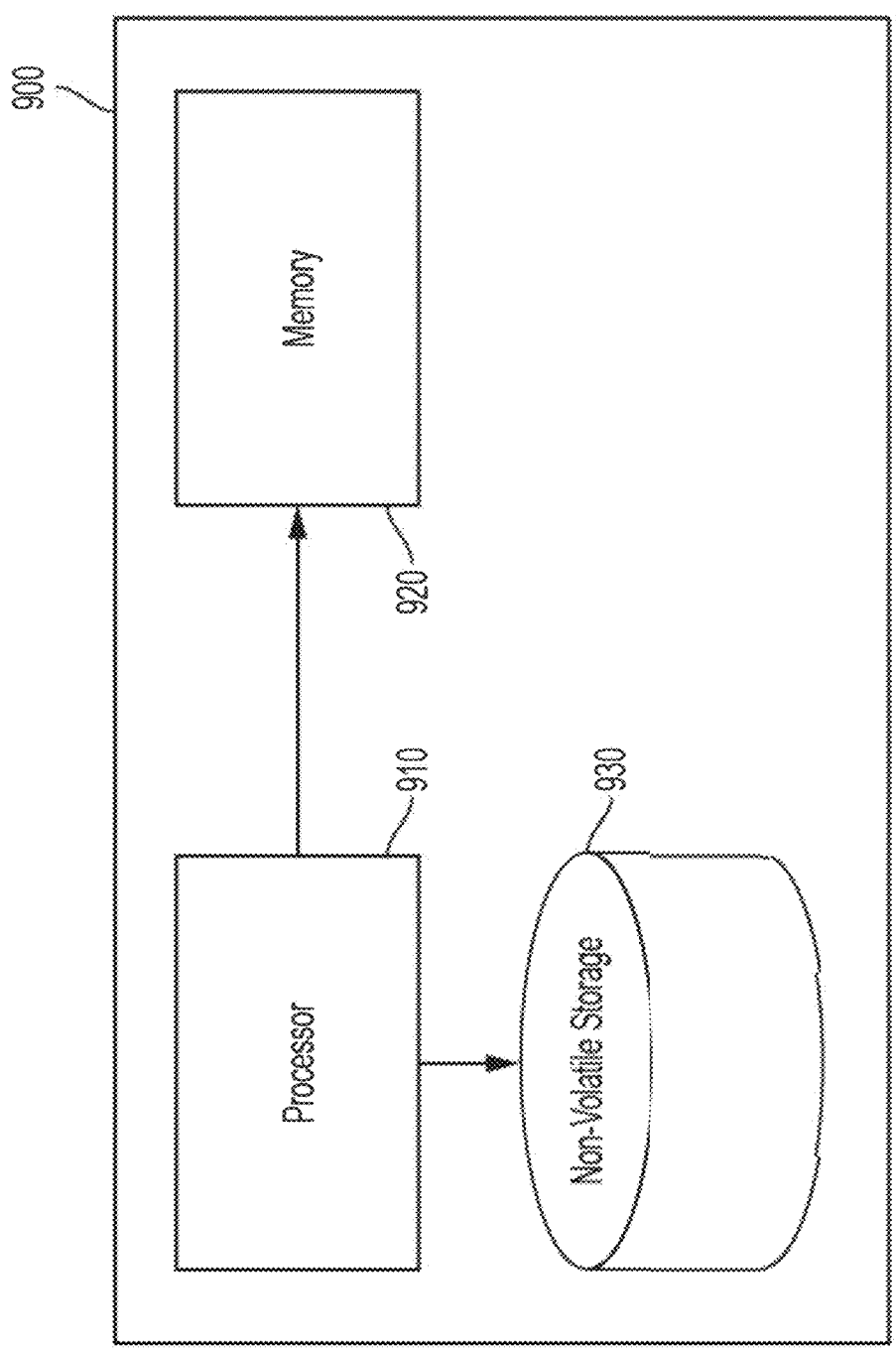
FIG. 9 is a diagram of an illustrative computer system that may be used in implementing some embodiments of the technology described herein.

An illustrative implementation of a computer system 900 that may be used in connection with any of the embodiments of the disclosure provided herein is shown in FIG. 9. The computer system 900 may include one or more computer hardware processors 900 and one or more articles of manufacture that comprise non-transitory computer-readable storage media (e.g., memory 920 and one or more non-volatile storage devices 930). The processor 910(s) may control writing data to and reading data from the memory 920 and the non-volatile storage device(s) 930 in any suitable manner. To perform any of the functionality described herein, the processor(s) 910 may execute one or more processor-executable instructions stored in one or more non-transitory computer-readable storage media (e.g., the memory 920), which may serve as non-transitory computer-readable storage media storing processor-executable instructions for execution by the processor(s) 910.

The terms "program" or "software" are used herein in a generic sense to refer to any type of computer code or set of processor-executable instructions that can be employed to program a computer or other processor (physical or virtual) to implement various aspects of embodiments as described above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for controlling a first computer program executing at a first computing device, the first computer program having a text-based user interface and configured to be controlled through the text-based user interface, the method comprising:
    using at least one computer hardware processor of a second computing device, remote from the first computing device, to execute a second computer program to perform:
        accessing a string representing a user interface (UI) screen of the text-based user interface of the first computer program, wherein the string comprises encoded characters representing data presented on the UI screen of the text-based user interface and index positions of the encoded characters;
        generating, based on the string, a two-dimensional (2D) representation of the UI screen of the text-based user interface of the first computer program at least in part by:
            identifying a plurality of fields in the UI screen of the text-based user interface at least in part by identifying one or more demarcation characters in the string;
            identifying a plurality of coordinates associated with the plurality of fields at least in part by deriving the plurality of coordinates from the index positions of the encoded characters; and
            generating the 2D representation of the UI screen using the plurality of fields and the plurality of coordinates;
        identifying a first controllable UI element in the UI screen of the text-based user interface at least in part by processing text in the 2D representation of the UI screen; and
        programmatically controlling the first computer program, with the second computer program, via the first controllable UI element of the UI screen of the text-based user interface to programmatically cause the first computer program to perform at least one action in furtherance of a task.

2. The method of claim 1, wherein the encoded characters are encoded in accordance with a CP1140 character encoding.

3. The method of claim 1, wherein the first computer program is a mainframe computer program.

4. The method of claim 1, wherein accessing the string and programmatically controlling the first computer program are performed using a synchronous terminal protocol.

5. The method of claim 4, wherein the synchronous terminal protocol is the TN 3270 protocol.

6. The method of claim 1, wherein accessing the string comprises connecting to the first computing device executing the first computer program using Transmission Control Protocol/Internet protocol (TCP/IP).

7. The method of claim 1, wherein generating the 2D representation further comprises:
    for each field of the plurality of fields, identifying whether the field is editable.

8. The method of claim 1, wherein the 2D representation comprises a plurality of rows, one or more rows of the plurality of rows corresponding to a field of the plurality of fields and including coordinates for the field.

9. The method of claim 1, wherein the 2D representation comprises a plurality of rows, each row of the plurality of rows including a set of fields having the same y coordinate in the UI screen.

10. The method of claim 1, wherein the 2D representation is stored in a dictionary where keys are y coordinates.

11. The method of claim 1, wherein the identifying the first controllable UI element comprises identifying a key-value pair using the 2D representation of the UI screen, the key-value pair comprising a key and a corresponding value.

12. The method of claim 1, wherein identifying the first controllable UI element comprises identifying a table using the 2D representation of the UI screen.

13. The method of claim 12, wherein identifying the table further comprises:
    identifying one or more table headings in the 2D representation of the UI screen; and
    identifying one or more rows corresponding to the one or more table headings in the 2D representation of the UI screen via one or more clustering techniques.

14. The method of claim 1, wherein programmatically controlling the first computer program comprises using the first controllable UI element to set a value in the UI screen of the text-based user interface of the first computer program.

15. The method of claim 14,
    wherein the first controllable UI element represents a key-value pair, and
    wherein setting the value comprises setting a value corresponding to the key.

16. The method of claim 14,
    wherein the first controllable UI element represents a menu comprising a plurality of options, and
    wherein setting the value comprises setting a value corresponding to an option of the plurality of options.

17. A system for controlling a first computer program executing at a first computing device, the first computer program having a text-based user interface and configured to be controlled through the text-based user interface, the system comprising:

at least one computer hardware processor of a second computing device, remote from the first computing device, configured to execute a second computer program to perform:
- accessing a string representing a user interface (UI) screen of the text-based user interface of the first computer program, wherein the string comprises encoded characters representing data presented on the UI screen of the text-based user interface and index positions of the encoded characters;
- generating, based on the string, a two-dimensional (2D) representation of the UI screen of the text-based user interface of the first computer program at least in part by:
  - identifying a plurality of fields in the UI screen of the text-based user interface at least in part by identifying one or more demarcation characters in the string;
  - identifying a plurality of coordinates associated with the plurality of fields at least in part by deriving the plurality of coordinates from the index positions of the encoded characters; and
  - generating the 2D representation of the UI screen using the plurality of fields and the plurality of coordinates;
- identifying a first controllable UI element in the UI screen of the text-based user interface at least in part by processing text in the 2D representation of the UI screen; and
- programmatically controlling the first computer program, with the second computer program, via the first controllable UI element of the UI screen of the text-based user interface to programmatically cause the first computer program to perform at least one action in furtherance of a task.

18. At least one non-transitory computer-readable storage medium storing processor executable instructions that, when executed by at least one computer hardware processor of a first computing device, cause the at least one computer hardware processor to perform a method for controlling a second computer program executing at a second computing device, the second computer program having a text-based user interface and configured to be controlled through the text-based user interface, the method comprising:
- accessing a string representing a user interface (UI) screen of the text-based user interface of the second computer program, wherein the string comprises encoded characters representing data presented on the UI screen of the text-based user interface and index positions of the encoded characters;
- generating, based on the string, a two-dimensional (2D) representation of the UI screen of the text-based user interface of the second computer program at least in part by:
  - identifying a plurality of fields in the UI screen of the text-based user interface at least in part by identifying one or more demarcation characters in the string;
  - identifying a plurality of coordinates associated with the plurality of fields at least in part by deriving the plurality of coordinates from the index positions of the encoded characters; and
  - generating the 2D representation of the UI screen using the plurality of fields and the plurality of coordinates;
- identifying a first controllable UI element in the UI screen of the text-based user interface at least in part by processing text in the 2D representation of the UI screen; and
- programmatically controlling the second computer program, with a first computer program executing at the first computing device, via the first controllable UI element of the UI screen of the text-based user interface to programmatically cause the second computer program to perform at least one action in furtherance of a task.

* * * * *